United States Patent Office 3,352,836
Patented Nov. 14, 1967

3,352,836
POLYAMIDES FROM 3-AMINOMETHYL-3,5,5-TRI-ALKYL-1-CYCLOHEXYLAMINE
Karl Schmitt, Herne, and Fritz Gude, Wanne-Eickel, Germany, assignors to Scholven-Chemie Aktiengesellschaft, Gelsenkirchen-Buer, Germany, a corporation of Germany
No Drawing. Filed Jan. 28, 1965, Ser. No. 429,208
Claims priority, application Germany, Jan. 30, 1964, Sch 34,550
15 Claims. (Cl. 260—78)

ABSTRACT OF THE DISCLOSURE

A polyamide of (a) 3-aminomethyl-3,5,5-trialkyl-1-cyclohexylamine; (b) a diamine which is a branched aliphatic diamine, branched or straight chain aromatic diamine, or branched or straight chain alicyclic diamine; and (c) dicarboxylic acid. The polyamides are useful as film-forming agents of coating compositions.

---

This invention relates to a process for the production of polymeric condensation products, said products constituting polyamides.

More particularly, this invention relates to a process for the production of polymeric condensation products by reaction of a dicarboxylic acid, cyclic diamines, and at least one member of the class of aliphatic, aromatic, and alicyclic diamines, the latter differing from the previously mentioned diamine component. This invention also relates to the polycondensates produced by the aforesaid methods.

There has been described in U.S. patent application Ser. No. 410,283, the same not representing or constituting prior art, a procedure for obtaining commercially interesting polyamide products through the use, as diamine component in place of the conventional aliphatic diamines, of a compound of the formula

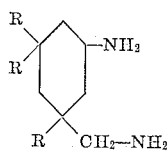

wherein each R designates the same or different alkyl groups and, preferably, methyl groups. It has also been suggested in this application to use mixtures of the aforesaid cyclic diamine with straight chained aliphatic diamines having the formula

wherein $x$ has a value of 2 to 10 under the same reaction conditions. Good products obtained in this manner are characterized by a number of exceptional properties, particularly in connection with reduced melt viscosity concomitantly with high surface hardness.

An object of this invention is to provide a new and improved method for making polymeric condensation products, said products constituting polyamides.

Another object of this invention is to provide a process for the conversion of a dicarboxylic acid cyclic diamine and at least one other diamine component of the class of branched chain aliphatic, aromatic, and alicyclic diamines to polyamides of improved transparency, surface hardness, and softening range.

Yet another object of the invention is to provide novel polymeric condensation products, said products constituting polyamides characterized by their transparency, surface hardness, broad softening range, etc.

Other objects will be apparent from the description and claims which follow.

In accordance with the invention, it has now been found that polyamides having excellent processing and fabricating properties are obtained by reacting (1) a compound of the formula

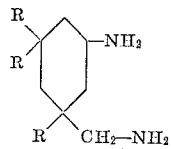

wherein each R designates the same or different alkyl groups and preferably lower alkyl groups of about 1 to 4 carbon atoms, most preferably methyl groups; (2) a dicarboxylic acid, and (3) at least one member of the group consisting of branched chained aliphatic, branched or straight aromatic and branched or straight chained alicyclic diamines. This last component—i.e., aliphatic, aromatic, and alicyclic diamine component preferably constitutes compounds having from 6 to 30 carbon atoms in their molecules.

The polyamides produced in accordance with the present invention are characterized by their excellent transparency, great surface hardness, and excellent gloss. These features, coupled with the fact that they are easily soluble in a number of solvents, as for instance alcohols and even aqueous alcohols especially when their molecular weight is below a certain range, as for instance from 8 to 9,000, pave the way to entirely new applications for these compounds for which polyamides have previously been incapable of use, such as for instance in paints, varnishes, surface protection agents, impregnating agents, cast films, and the like. The three alkyl groups linked to the cyclohexane ring furthermore establish that the amino group attached to the ring is considerably more firmly bound than is generally the case with amino groups otherwise linked to the ring or to secondary carbon atoms since the latter readily and frequently split off the ammonia to form a double bond.

When aromatic diamines are utilized, as for instance phenylene diamines and/or benzidine, while the brittleness of the resulting polyamide is generally increased, at the same time the thermal stability under load is increased.

The use of alicyclic diamine, such as for example 1,3-bis-(3-aminopropoxy)-cyclohexane or the hydrogenation products of the aforesaid aromatic diamines, the preparation of which is described hereinafter, considerably reduces the water absorption of the resultant polyamides. This provides for the valuable use of such copolyamides in the electrical industry where such properties are highly desirable.

The 1,3 - bis-(3-aminopropoxy)-cyclohexane starting material is prepared by hydrogenating resorcinol in methanolic solution using a nickel catalyts at 100 to 105° C. and a pressure of 150 atmospheres to produce cyclohexane diol-(1,3). The cyclohexane diol-(1,3) thus produced is reacted with acrylonitrile in the presence of metallic sodium at 70 to 85° C. to produce 1,3-di-β-cyano-ethoxy cyclohexane which, following filtration, is washed first with a small amount of 50% phosphoric acid, then several times with water and, after drying, is subjected to distillation under vacuum. This intermediate product is hydrogenated in the presence of Raney cobalt, dioxane, and liquid ammonia in an autoclave under a pressure of 130 atmospheres and a temperature of about 110° C. Following filtration, the hydrogenated product is fractionated using a vacuum of 1 mm. Hg. The 1,3-bis-(3-aminopropoxy)-cyclohexane passes over at 160 to 163° C.

The polyamides of the invention are of water-clear transparency and of an exceptionally light color. Methyl-substituted hexamethylene diamines, as for instance mono, di-, or tri-methylated hexamethylene diamine are preferred as the cyclic diamine components since they lead to the production of soluble products. The tri-methylated hexamethylene diamine can be readily obtained, for example, from trimethyl adipic acid and ammonia by converting the said acid into the corresponding di-nitrile and hydrogenating the di-nitrile.

The copolyamides produced in accordance with the invention differ from the conventional polyamides as heretofore produced by their broad plastic ranges which make it possible to work the same on rollers or in kneaders. The great advantage of the co-condensates of the invention is that it is possible to select the properties of the final products in a desired direction.

The proportion of the branched aliphatic and/or aromatic and/or alicyclic diamines can vary within very wide limits. In general, an amount of from 2 to 80% by weight referred to the cyclic diamine of the branched aliphatic and/or aromatic and/or alicyclic diamine component is employed. Preferably from 5 to 60 weight percent of said diamine component is utilized referred to the cyclic diamine.

As dicarboxylic acid condensation component there can be used an aliphatic dicarboxylic acid, saturated or unsatuarted, having up to about 12 carbon atoms, preferably up to 10 carbon atoms and most preferably from about 2 to 10 carbon atoms. There can also be used an aromatic dicarboxylic acid or hydro-aromatic acid as, for example, such an acid containing up to about 10 carbon atoms. As suitable aliphatic dicarboxylic acids, there can be mentioned acids such as mono-, di-, or tri-alkylated adipic acid, succinic acid, glutamic acid, pimelic acid, fumaric acid, itaconic acid, citraconic acid, mesaconic acid, and the like. Instances of suitable aromatic and hydro-aromatic acids, include phthalic acid, isophthalic acid, terephthalic acid, and their hydrogenation products, phenylene dipropionic acid, phenylene diacetic acid, etc. Ketone carboxylic acid and the corresponding thio compounds can also be suitably used. The use of small quantities of polyfunctional compounds, such as methylene diadipic acid can have a favorable effect on reducing the sensitivity of the resulting products to water.

It is also possible, in accordance with the invention, to use any of the aforementioned acids in the form of mixtures thereof.

The novel polycondensates of the invention are characterized by a large number of excellent properties and particularly by their water-clear transparency and their increased surface-hardness values.

Certain variations in the properties of the novel polycondensates are furthermore possible in the selection of the individual components. Thus, for example, by suitable selection of the dicarboxylic acids, the softening point can be varied within a relatively wide range of between about 90 and 300° C.

The condensation reaction is carried out under the conventional conditions. The starting components can be utilized in their free form or else in the form of the salts of the diamines with the dicarboxylic acids, which are in each instance readily prepared in the conventional manner.

However, it is also possible to use, in place of the free dicarboxylic acids, carboxylic acid derivatives, such as esters, halides, amides, etc., from which the polyamides are formed under the condensation conditions by the splitting-off of chemical moieties such as hydro-halic acids, alcohols, ammonia, and its derivatives, etc.

The condensation can be conducted in the presence of solvents, such as water, aromatics, aliphatic, isocyclics, alcohols, phenols, cresoles, xylenols, halogenated hydrocarbons, etc., and equally well, without any diluent whatsoever.

In order to control the length of the chain of the resulting condensates, small quantities (0.2 to 1%) of terminal group stabilizes can be added. Such terminal group stabilizers include mono- or dicarboxylic acids, as e.g. acetic acid, adipic acid, also mono- or diamines, monoamines, and the like. The degree of polycondensation is, of course, effected by the nature and quantity of these stabilizers.

In order to obtain uniform, colorless end products, it is advantageous to effect the condensation under exclusion of atmospheric oxygen as far as possible. Preferably, it is desirable to conduct the condensation in an atmosphere of pure nitrogen.

The temperatures for the condensation are approximately within the range of 150 to 300° C. The condensation was preferably carried out by first slowly heating the mixture of components after melting, with the possible addition of a diluent such as water, alcohol, etc. and after this precondensation stage a vacuum of about $10^{-2}$ mm. Hg is applied, the temperature being slowly increased corresponding to the increase in the melt viscosity. By varying the reaction conditions, the properties of the final products can be further controlled. Thus longer reaction times and/or higher vacuum and/or smaller quantities of end group stabilizers result in the production of products having increased $\eta_{red}$ values.

The invention is illustrated by the following examples of certain preferred embodiments thereof, although it will be understood that the examples are illustrative only and not intended to limit the scope of the invention unless otherwise specifically indicated.

In the examples there is indicated, as a measure of the molecular weight of the polyamides, the reduced specific viscosity ($\eta_{red}$) determined as a 1% solution in pure formic acid at 20° C.

The ball indentation hardness values recited were determined in accordance with DIN 57,302 (diameter of ball 5 mm., test load 50 kg.). The first value obtained ("0 sec.") is given in the table as the ball indentation hardness.

In order to determine the softening range, a sample of the material of the size of a pinhead is placed between two cover glasses and transferred to a hot stage microscope having a magnification of 100. The sample is heated to about 20° C. below the expected onset of the softening range and thereafter the temperature is increased on the hot stage by about 1 to 2° C. per minute while the sample is maintained under continuous observation. The first visible initial melting is taken as the starting point of the softening range and, as the end value, there is taken the complete liquefaction of the sample.

The mixture of salts or dicarboxylic acids and diamines indicated in the table were heated under reflux in a small glass flask in an atmosphere of nitrogen for three hours at 220 to 270° C. The polycondensation was carried out to completion at about 250 to 270° using a vacuum of 14 mm. Hg for a period of eight hours.

The foregoing examples were carried out with small quantities of substances. Solvents can be used in accordance with greater amounts of substances. If a solvent is used, there may be employed any of the conventional aromatic hydrocarbon solvents, e.g. benzene or its alkylated derivatives, or aliphatic hydrocarbon solvents, e.g. of about 6 to 12 carbon-atoms, and alicyclic hydrocarbons, e.g. cyclohexane and its derivatives, also halogenated hydrocarbons with boiling points to about 160° C., e.g. chloroform, carbon-tetrachloride, trichlorethylene, bromo-benzene etc. and also low alcohols as well as water. The precondensation can be supported under a pressure to about 50 atm. In the following the solvent can be drawn off by distillation. The condensation was continued under atmospheric pressure or vacuum of $10^{-2}$ mm. Hg according to the molecular weight of the end product.

The abbreviations in the table designate the following:

| | |
|---|---|
| Cyclic diamine | 3 - (aminomethyl) - 3,5,5-trimethyl - 1 - cyclohexylamine. |
| Adip. | Adipic acid. |
| MMA | β-Methyladipic acid. |
| Sebac. | Sebacic acid. |
| Tereph. | Terephthalic acid. |
| TM-hexamethylenediamine | Isomeric mixture of β,β',δ-trimethyl - hexamethylenediamine and β,δ,δ'-trimethylhexamethylene diamine. |
| MM-hexamethylenediamine | γ - Methyl - hexamethylene diamine. |

Mol ratio in the following salts of the dicarboxylic acid: diamine=1:1.

| Salt I | | Salt II | | $\eta_{red}$ | Ball indentation hardness, kg./cm.$^2$ | Softening range, °C. | Appearance |
|---|---|---|---|---|---|---|---|
| Percent by wt. | Composition | Percent by wt. | Composition | | | | |
| 50 | MMA-cyclic diamine | 50 | Adip.-hexamethylene diamine | 1.9 | 1,650 | 140-166 | Slight clouding. |
| 20 | do | 80 | Adip.-TM-hexamethylene diamine | 1.8 | 1,380 | 118-144 | Clear. |
| 50 | Sebac.-cyclic diamine | 50 | do | 2.1 | 1,280 | 118-146 | Do. |
| 50 | do | 50 | MMA-hexamethylene diamine | 2.1 | 1,240 | 135-154 | Do. |
| 50 | do | 50 | Adip.-1,3-di-γ-(aminopropoxy)-cyclohexane.* | 0.6 | 1,210 | 104-127 | Slight clouding. |
| 50 | MMA-cyclic diamine | 50 | Adip.-MM-hexamethylene diamine | 1.2 | 1,420 | 132-159 | Clear. |

*Used without formation of salt.

| Salt I | | Salt II | | Salt III | | $\eta_{red}$ | Ball indentation hardness, kg./cm. | Softening range °C. | Appearance |
|---|---|---|---|---|---|---|---|---|---|
| Percent by wt. | Composition | Percent by wt. | Composition | Percent by wt. | Composition | | | | |
| 33 | Adip.-ring diamine | 33 | Adip.-hexamethylene diamine | 18 | Terephthalic acid dimethyl ester | 0.3 | 1,516 | 152-198 | Slight clouding. |
| | | | | 16 | Ring diamine | | | | |
| 42 | do | 42 | do | 16 | Adip.-p-phenylene diamine. | 0.18 | 1,383 | 93-183 | Clear. |
| 42 | do | 42 | do | 16 | Adip.-benzidine | 0.31 | 995 | 113-149 | Do. |

We claim:
1. A polyamide of a mixture consisting essentially of 3-aminomethyl-3,5,5-trialkyl-1-cyclohexylamine, a dicarboxylic acid and at least one diamine selected from the group consisting of branched aliphatic diamines, branched and straight chained aromatic diamines and branched and straight chained alicyclic diamines.

2. A polyamide according to claim 1, said alkyl groups of 3-aminomethyl-3,5,5-trialkyl-1-cyclohexyl-amine being methyl.

3. A polyamide according to claim 1, wherein said dicarboxylic acid has up to about 12 carbon atoms.

4. A polyamide according to claim 1 wherein said dicarboxylic acid is at least one member selected from the group consisting of aliphatic hydrocarbon dicarboxylic acids having up to about 12 carbon atoms and aromatic hydrocarbon dicarboxylic acids having up to about 10 carbon atoms.

5. A polyamide according to claim 4 wherein said dicarboxylic acid is selected from the group consisting of adipic, malonic, suberic, succinic, pimelic, azelaic, sebacic, fufaric, phthalic, isophthalic, terephthalic, phenylene dipropionic, and phenylene diacetic acids.

6. A polyamide according to claim 1, wherein said last-mentioned diamine group member has from 6 to 30 carbon atoms.

7. A polyamide according to claim 1, wherein said last-mentioned diamine group member is at least one member selected from the group consisting of phenylene diamine, benzidine, and 1,3-bis-(3-aminopropoxy)-cyclohexane.

8. A polyamide according to claim 1 of 3-aminomethyl-3,5,5-trialkyl-1 - cyclohexylamine, a polymethylene diamine of the formula $H_2N—(CH_2)_x—NH_2$ wherein $x$ is 2–10, a dicarboxylic acid and at least one diamine selected from the group consisting of branched aliphatic diamines, branched and straight chained aromatic diamines and branched and straight chained alicyclic diamines.

9. A polyamide according to claim 1, the proportion of the last-mentioned diamine group member being about 2 to 80 wt. percent referred to the cyclic diamine component.

10. A polyamide according to claim 1, the proportion of the last-mentioned diamine group member being about 5 to 60 wt. percent referred to the cyclic diamine component.

11. A polyamide according to claim 1, of 3-(aminomethyl)-3,5,5-trimethyl-1-cyclohexylamine, sebacic acid, adipic acid, and an isomeric mixture of β,β,δ-trimethyl hexamethylene-diamine and β,δ,δ'-trimethylhexamethylene diamine.

12. A polyamide according to claim 1, of 3-(aminomethyl)-3,5,5-trimethyl-1-cyclohexylamine, sebacic acid, adipic acid, and 1,3-di-(γ-aminopropoxy)-cyclohexane.

13. A polyamide according to claim 1, of 3-(aminomethyl)-3,5,5-trimethyl-1 - cyclohexylamine, adipic acid hexamethylene diamine and p-phenylene-diamine.

14. A coating composition consisting essentially of, as film forming ingredient, a polyamide according to claim 1 and a coating composition solvent, the polyamide being dissolved in said solvent.

15. A coating composition consisting essentially of, as film forming ingredient, a polyamide according to claim 8 and a coating composition solvent, the polyamide being dissolved in said solvent.

References Cited

UNITED STATES PATENTS

| | | | |
|---|---|---|---|
| 2,985,626 | 5/1961 | Caldwell et al. | 260—78 |
| 2,985,628 | 5/1961 | Caldwell et al. | 260—78 |
| 3,012,994 | 12/1961 | Bell et al. | 260—78 |

WILLIAM H. SHORT, *Primary Examiner.*

H. D. ANDERSON, *Assistant Examiner.*